United States Patent [19]

Amery et al.

[11] 4,110,784

[45] Aug. 29, 1978

[54] NOISE REDUCTION APPARATUS

[75] Inventors: John Gordon Amery, Quincy, Ill.;
Thomas William Burrus,
Indianapolis, Ind.

[73] Assignee: RCA Corporation, New York, N.Y.

[21] Appl. No.: 718,804

[22] Filed: Aug. 30, 1976

[51] Int. Cl.$^2$ .................. H04N 5/14; H04N 5/78;
H04N 9/535; H04B 15/00
[52] U.S. Cl. ..................................... 358/8; 358/36;
358/167; 328/167
[58] Field of Search .............. 358/36, 8, 39, 167;
325/65, 473, 474, 477; 328/167; 179/1 P

[56] References Cited

U.S. PATENT DOCUMENTS

| 3,288,930 | 11/1966 | Johnson | 358/167 |
|---|---|---|---|
| 3,333,055 | 7/1967 | Krause | 358/167 |
| 3,602,737 | 8/1971 | Radecke | 328/167 |
| 3,715,477 | 2/1973 | Olson et al. | 358/36 |
| 4,009,334 | 2/1977 | Sypula | 358/36 |
| 4,031,547 | 6/1977 | Saiki et al. | 358/167 |

Primary Examiner—John C. Martin
Attorney, Agent, or Firm—E. M. Whitacre; W. H. Meagher; H. N. Garrana

[57] ABSTRACT

Improvement of the signal-to-noise ratio for a wideband video signal is effected by subtraction from the wideband video signal of a signal which follows low-amplitude excursions of the video signal's high frequency component. The latter signal is formed by a circuit arrangement which includes a high pass filter, of a C-R differentiator form, coupled to the input of an amplifier. A negative feedback path, coupled between the amplifier output and the junction of capacitive and resistive elements of the differentiator includes threshold devices which permit activation of the negative feedback path only during input signal excursions which exceed selected close-to-axis limits. The threshold device disposition relative to the high pass filter elements is such that negative feedback path activation also serves to introduce an appreciable reduction in the effective time constant of the differentiator, whereby a rapid return from a large input signal excursion beyond one of the selected limits may be followed at the amplifier input. In an illustrative use, the noise reduction circuitry is advantageously employed to process a luminance signal component separated by comb filtering from a composite signal recovered during playback of a video disc, with the subtraction step being effected in apparatus also serving to recombine separated luminance and chrominance components for formation of the disc player's output composite signal.

7 Claims, 1 Drawing Figure

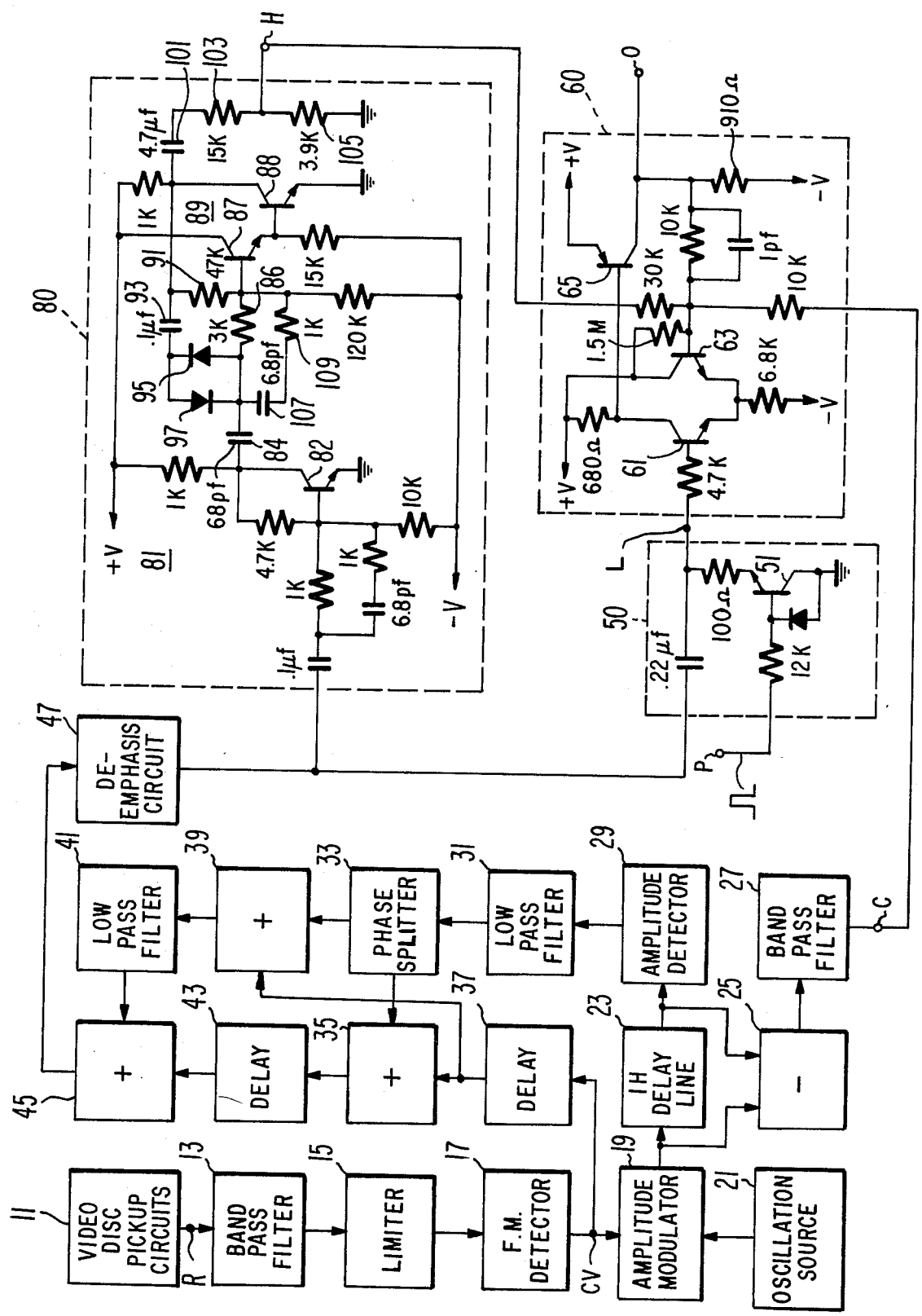

NOISE REDUCTION APPARATUS

The present invention relates generally to noise reduction apparatus, and particularly to noise reduction apparatus of a form advantageous for use in the improvement of the signal-to-noise ratio of signals developed by video disc players.

It has been proposed in the prior art (e.g., British Pat. No. 685,483) to effect signal-to-noise improvement for a video signal by subjecting the high frequency portion of the signal to the action of a network having a non-linear transfer characteristic of a type providing substantially zero response to signal excursions in the immediate vicinity of the zero axis of the high frequency signal portion. The network action may be viewed as "coring" the high frequency signal, i.e., removing from the signal the close-to-axis core thereof. With suitable restriction of the limits of the region of substantially zero response, small amplitude excursions about the zero axis may be eliminated without intolerable distortion of larger amplitude excursions. As a result, background noise components may be eliminated or significantly reduced in amplitude with little disturbance of desired high frequency components of the video signal.

In one convenient approach to application of the above-described coring principles to video signal noise reduction (shown, for example, in U.S. Pat. No. 3,602,737), the high frequency portion of a wideband video signal is selectively passed by a high pass filter to the input of an amplitude limiter which eliminates signal excursions beyond selected close-to-axis limits, and the limiter output is subtractively combined with the wideband video signal to effect the desired "coring" via component cancellation.

In accordance with the principles of the present invention, the aforesaid cancellation approach to noise reduction in video signal systems is advantageously realized by apparatus wherein the limiter function is achieved by an amplifier provided with a negative feedback path incorporating threshold devices which activate the negative feedback path only during signal excursions beyond the selected close-to-axis limits. The amplifier output, effectively limited to signal excursions within the selected limits, is supplied to an attenuator whch reduces the amplified signal excursions to a level suitable for effecting the desired cancellation of low level components of the wideband video signal.

By suitable disposition of the feedback path of the limiting amplifier relative to the elements of a preceding frequency selective network (serving to selectively pass the high frequency components of the video signal), one may utilize the activation of the feedback path to modify, in an advantageous manner, the performance of the frequency selective network during rapid and large signal excursions. In accordance with an illustrative embodiment of the present invention, a simple capacitance-resistance differentiating network coupled to the input of an amplifier has values chosen to permit high frequency video signal component passage while significantly attenuating low frequency video signal components. The parallel combination of a pair of oppositely poled diodes is connected in series with a large-valued blocking capacitor between the amplifier output and the differentiating capacitor. The diodes function as threshold devices which activate a negative feedback path for the amplifier when input signal excursions exceed given limits, the negative feedback path activation effectively precluding the amplifier output from following input signal excursions beyond such limits. Moreover, the conduction of a feedback path diode achieves an appreciable reduction in the effective time constant of the differentiating network, whereby a rapid return from a large input signal excursion beyond the given limits may be followed at the amplifier input.

In an illustrative use, the noise reduction apparatus of the present invention is advantageously employed in a video disc player to modify a luminance signal component separated by comb filtering action from a composite color video signal of a so-called "buried subcarrier" form (as described, for example, in U.S. Pat. No. 3,872,498 — Pritchard). In such an application of the principles of the present invention, the subtraction step which effects low-amplitude component cancellation is carried out by apparatus also serving to effect recombination of luminance and chrominance information for purposes of formation of the player's output composite signal.

The accompanying drawing illustrates, partially schematically and partially by block diagram representation, video disc playback apparatus incorporating noise reduction circuitry in accordance with an illustrative embodiment of the present invention.

As illustrated in the drawing, a video disc player includes video disc pickup circuits 11 (which may, for example, be of the general type shown in U.S. Pat. No. 3,842,194 Clemens) for developing an output at terminal R which is representative of signals recorded on a video disc. Illustratively, the recorded signals are of the type described in U.S. Pat. No. 3,969,756—Clemens, et al.; and include picture carrier waves modulated in frequency in accordance with the amplitude of composite color video signals.

A bandpass filter 13, coupled to terminal R and having a passband encompassing the picture carrier deviation range and significant sidebands thereof, selectively passes the frequency modulated picture carrier waves to a limiter 15, which serves to remove spurious amplitude modulation of the picture carrier waves. The limiter output is applied to a frequency modulation detector 17, which recovers the modulating information, developing composite color video signals at the detector output terminal CV. Pursuant to the illustrative recording signal parameters of the aforementioned U.S. Pat. No. 3,969,756, the recovered composite signals include a luminance signal component occupying a 0–3 MHz. band of frequencies, and a chrominance signal component falling in a midband portion (1–2 MHz.) of the luminance band. The chrominance signal comprises modulated color subcarrier waves, with the subcarrier frequency corresponding to an odd multiple of half the line frequency (e.g., 195 times $f_H/2$, or approximately 1.53 MHz.), and with the subcarrier sideband components falling within regularly spaced segments of said midband (interleaved with midband components of the luminance signal).

Where the output of the video disc player is to be applied to a conventional color television receiver, it is desirable to effect transcoding of the composite signal from the "buried subcarrier" format in which it appears at terminal CV to a format compatible with the composite signal processing circuitry of the color television receiver (e.g., to an NTSC-like format, wherein the color subcarrier lies at 455 $f_H/2$, or approximately 3.58 MHz). In the illustrative player arrangement of the drawing, such transcoding is effected by circuitry disposed in a configuration generally described in U.S. Pat. No. 3,969,757 — Amery.

For the aforesaid transcoding purposes, the signal appearing at terminal CV is supplied, as a modulating signal input, to an amplitude modulator 19, also receiving a carrier wave input supplied by an oscillation source 21. The frequency of the carrier waves supplied by source 21 desirably corresponds to the sum of the buried subcarrier frequency of the recovered composite signals and the desired output subcarrier frequency (e.g., such sum corresponding to 325 $f_H$, or approximately 5.11 MHz.) so that the color subcarrier falls at the desired output subcarrier frequency in the lower sideband of the modulated carrier wave output of modulator 19. However, where time base errors engendered in the playback operation cause the recovered subcarrier frequency to depart from its intended buried subcarrier value, it is desirable that the frequency of the carrier waves supplied by source 21 follows such departures so as to maintain the subcarrier frequency in the lower sideband of the modulator output at the desired output subcarrier frequency. For such output frequency stabilization purposes, the oscillation source 21 desirably takes the form of a voltage controlled crystal oscillator controlled by suitable phase locked loop circuitry, as shown, for example, in the aforementioned U.S. Pat. No. 3,969,757.

The output of modulator 19 is applied to the input of a 1H delay line 23, having a passband of sufficient width to encompass the frequencies of the carrier wave and its lower sideband. The signals at the input and the output of delay line 23 are applied to a subtractive combiner 25. The combination of elements 23 and 25 forms a comb filter of a form exhibiting regularly spaced rejection notches recurring at even multiples of half the line frequency, with interleaved pass bands centered about odd multiples of half the line frequency. The combiner output is applied to a bandpass filter 27, having a passband restricted to the frequency band (e.g., 3.08 –4.08 MHz.) occupied by the sidebands of the frequency translated color subcarrier. The output of bandpass filter 27, appearing at terminal C, comprises a chrominance signal, freed from accompaniment by luminance signal components and occupying a frequency band location desired for compatibility with television receiver signal processing circuitry.

The output of delay line 23 is applied to an amplitude detector 29, which effects demodulation of the modulated carrier waves it receives. The detector output is supplied to a lowpass filter 31, having a cutoff frequency corresponding to the highest frequency (e.g., 3 MHz.) of the recovered composite signals. The output of lowpass filter 31 thus corresponds to a delayed version of the composite signals appearing at terminal CV. The signals appearing at terminal CV are applied to a delay device 37, which imparts a delay of a magnitude substantially corresponding to the delay introduced by lowpass filter 31, whereby the difference in delay of the respective outputs of elements 31 and 37 corresponds to the line interval delay introduced by the 1H delay line 23.

The output of lowpass filter 31 is delivered to a phase splitter 33, which provides versions of the delayed composite signal of mutually opposed phasing as respective outputs. One of the outputs of phase splitter 33 is additively combined with the output of delay device 37 in adder 35, while the other of the outputs of phase splitter 33 is additively combined with the output of delay device 37 in adder 39. The poling of the phase splitter output supplied to adder 35 is such that the signal addition therein produces the effect of a comb filter of the type having regularly spaced rejection notches falling at odd multiples of half the line frequency, with interleaved pass bands centered about even multiples of half the line frequency. The output of adder 35 thus includes luminance signal components, substantially freed from accompaniment by buried subcarrier sideband components. However, the combing action extends below the shared midband, and thus eliminates luminance components in an unshared lowband (e.g., 0 –1 MHz.) including components desired for retention for adequate vertical detail rendition in reproduced images.

The opposite poling of the phase splitter output delivered to adder 39, however, is such that its additive combination with the output of delay device 37 results in a comb filtering action of a type complementary to that provided by adder 35, whereby components eliminated in the output of adder 35 are present in the output of adder 39. The output of adder 39 is applied to a lowpass filter 41 having a cutoff frequency below the lowest buried subcarrier sideband component frequency, with an illustrative choice permitting passage of a vertical detail signal in a band of approximately 0 - 500 KHz while blocking passage of the buried subcarrier chrominance component.

The output of lowpass filter 41 is applied to an adder 45 for additive combination with the output of adder 35. A delay device 43 is interposed in the coupling of the adder 35 output to an input of adder 45, with the signal delay introduced thereby chosen to substantially match the delay introduced by lowpass filter 41.

The output of adder 45 comprises a luminance signal with restored vertical detail information, with the adding of the complementary comb filter outputs effectively providing a "filling in" of the luminance component combing over a lowband determined by the passband of filter 41 (in the manner discussed, for example, in U.S. Pat. No. 2,729,698, issued to G. Fredendall). The output of adder 45 is supplied to a de-emphasis circuit 47 which provides a de-emphasis of the luminance component high frequencies in a manner suitably complementary to the pre-emphasis thereof employed in the disc recording operation.

The output of de-emphasis circuit 47 is applied to a clamp circuit 50, which serves to restore the DC component of the luminance signal. As shown, the clamp circuit 50 is of the keyed clamp type, utilizing a transistor 51 which is periodically keyed into conduction by periodic, line rate, keying pulses, supplied to a keying pulse input terminal P, and timed to coincide with periodic reference amplitude intervals of the luminance signal (e.g., during horizontal sync tip appearances). Reference may be made to the copending U.S. patent application of A. Baker, Ser. No. 590,485, for a description of suitable apparatus for developing the aforesaid keying pulses in response to the deflection synchronizing components of the recovered luminance signal.

The clamped output of circuit 50, appearing at terminal L, forms a wideband luminance component input for a signal combining circuit 60, which combines such input with the frequency translated chrominance signal component from the filter output terminal C to form an output composite signal (at the combiner output terminal 0) of a form suitable for application to a conventional color television receiver. Where such application is to be to the receiver's antenna terminals, the signal at terminal 0 may serve as the composite video signal input to transmitter apparatus, of a form, for example, as is shown in U.S. Pat. No. 3,775,555 — Carlson.

In addition to serving the aforementioned function of combining luminance and chrominance signals for output composite signal formation, the combining circuit 60 also serves in implementation of the noise reduction principles of the present invention by selectively effecting cancellation of low-amplitude high frequency components of the signal input from terminal L. The cancellation of such components of the signal input from terminal L (which is delivered to the base of a first combiner transistor 61) is achieved by the application to the emitter of transistor 61 of a signal containing the same low-amplitude high frequency components, with substantially matching phase and amplitude. This additional signal, derived from the output terminal H of high pass limiter apparatus 80, is applied to the base of a second combiner transistor 63, which is emitter-coupled to the first combiner transistor 61. The base of the second combiner transistor 63 also receives the chrominance signal input from terminal C. A combination of the signal inputs from terminals L and C, minus those low-amplitude, high frequency components of the signal input from terminal L which have been effectively cancelled by the signal input from terminal H, appears at the collector of transistor 61. The combining circuit 60 additionally includes a third transistor 65, which inverts the aforesaid signal combination for delivery to the combining circuit output terminal 0 (and for feedback to the base of transistor 63).

The circuit arrangement of the high pass limiter apparatus 80 includes an input amplifying stage 81, which employs a grounded-emitter transistor 82 to effect amplification and phase inversion of the wideband signal output of de-emphasis circuit 47. The output of the amplifying stage 81 is coupled, by a network including a capacitor 84 in series with a resistor 86, to the base of an emitter-follower transistor 87. The emitter-follower transistor 87, in cascade with a grounded-emitter transistor 88, forms a phase inverting, output amplifying stage 89. Feedback via resistor 91, coupled between the collector of transistor 88 and the base of transistor 87, ensures that the output amplifying stage 89 presents a low imput impedance to its signal input.

Capacitor 84 and resistor 86 form a differentiator, which effects a high pass filtering of the wideband signal output of the input amplifying stage 81, so that significant input current variations in transistor 87 occur only in response to high frequency components of the signal output of de-emphasis circuit 47.

An amplitude limiting action is provided for the output amplifying stage 89 by an additional feedback network which is coupled between the collector of output transistor 88 and the junction of the differentiator elements 84, 86. The feedback network includes a blocking capacitor 93 in series with a pair of diodes 95, 97 in parallel. The diodes 95, 97 are connected so as to be oppositely poled in the feedback path.

When the amplitude excursions of the high frequency components of the input signal to transistor 87 are sufficiently small, the diodes 97, 95 remain in non-conducting states and the additional feedback network is not activated. In this mode of operation, the input signal excursions are amplified by the output amplifying stage 89 with a gain primarily determined by the ratio of the resistance values of resistors 91 and 86.

When an input component amplitude excursion in a first direction reaches a first threshold level, the resultant swing at the collector of transistor 88 is sufficient to forward bias one of the pair of diodes to activate the additional feedback network. Likewise, when an input component amplitude excursion in the opposite direction reaches a second threshold level, the resultant swing at the collector of transistor 88 is sufficient to forward bias the other of the pair of diodes to activate the additional feedback network. Input component amplitude excursions beyond either of the aforesaid threshold levels are not followed at the collector of output transistor 88 because of the activated state of the additional feedback network.

The collector of transistor 88 is coupled by a blocking capacitor 101 to an attenuator formed by the series combination of resistors 103 and 105. The attenuator output appears at the limiter output terminal H, coupled to the junction of resistors 103 and 105.

In the described video disc player apparatus of the drawig, the desired composite video signals which appear at the output terminal CV of the FM detector 17 are accompanied by undesired noise components. While such noise components are present throughout the wideband spectrum of the desired signal, there is a tendency for the amplitude of the noise components at the high frequency end of the signal spectrum to be greater than the amplitude of the noise components at the low frequency end of the signal spectrum. While the operation of de-emphasis circuit 47 contributes a reduction in the amplitude of the high frquency noise components which accompany the wideband luminance signal components at the terminal L input to combining circuit 60, the amplitude of the residual high frequency noise components at terminal L may still be sufficient to impose a visibly noisy background on pictures displayed in response to the accompanying luminance signal. However, the "coring" action provided by the cancelling effect of the limited signal applied from terminal H to combining circuit 60 serves to eliminate, or sufficiently attenuate, such residual high frequency noise components in normal playback circumstances, as to ensure a reasonably quiet background in pictures displayed in response to the output signal of the combining circuit 60. This result can be attained with limiter threshold levels suitably set so that signal removal is restricted to a very small percentage (e.g., 2%) of the maximum peak-to-peak swing of the luminance signal, whereby fast, large amplitude video signal transitions suffer only a slight loss of amplitude through the coring action.

The feedback network diodes 97, 95, in the illustrated circuit arrangement of the high pass limiter appartus 80, not only serve as the threshold devices for a feedback path which introduces limiting for input component amplitude excursions beyond selected threshold levels, but also serve to bypass the resistive element of the differentiator network during beyond-threshold excursions to significantly reduce the effective differentiator time constant under such circumstances. When one of the diodes 97, 95 is conducting, a low impedance path comprising the conducting diode, blocking capacitor 93 and the emitter-collector path of output transistor 88 is formed which permits rapid alteration of the charge on differentiator capacitor 84. When the onset of a fast, large amplitude video transition initiates an amplitude excursion beyond a threshold level and activates feedback limiting, the simultaneous introduction of the low impedance charge alteration path permits alteration of the charge on capacitor 84 to proceed at a sufficiently rapid rate that a return to axis vicinity at the termination of the high frequency component excursion occurs with substantially proper timing at terminal H. This assures minimum disturbance of the transition rendition in the displayed picture.

In contrast, if the differentiator time constant reduction was not provided during beyond-threshold excursions (i.e., if the differentiator resistor 86 remained the main path for alteration of the charge on capacitor 84 during such excursions), a fast, large amplitude video transition would appear in the displayed picture with a trailing "ghost" (the result of a slow dispersal of a peak charge on capacitor 84, and a consequent delayed return to axis vicinity of the limited signal component at terminal H).

To aid in maintaining adequate amplifier gain at the high frequency extremity (e.g., 3 MHz.) of the wideband signal spectrum, a speedup network, comprising capacitor 107 in series with resistor 109, appears in shunt with differentiator resistor 86. The gains provided by amplifying stages 81, 89 are chosen with relation to the signal swing required for diode turn-on so that an acceptable percentage (e.g., 2%) of the maximum peak-to-peak video signal swing is encompassed between the limiting levels. The attenuation ratio provided by attenuator 103, 105 is chosen with relation to such selected amplifier gains, so that substantial cancellation may be effected at the aforesaid high frequency extremity.

At frequencies in the vicinity of the aforesaid high frequency extremity (e.g., 3 MHz.) of the luminance signal band, only a small magnitude of phase shift is introduced by the differentiator 84, 86. In view of the successive phase inversions provided by the input amplifying stage 81, and the output amplifying stage 89, low-amplitude excursions of such high frequency components (passed by the differentiator with little phase shift) arrive at the output terminal H bearing an essentially in-phase relationship to the counterpart high frequency components in the signal appearing at terminal L. With such a phase-matching relationship established, and with an amplitude-matching relationsip realized by suitble choice of the attenuation ratio of voltage divider 103, 105 relative to the gains imparted by the amplifying stages 81, 89, close to full cancellation of the low-amplitude excursions of such high frequency components is achieved in combiner 60.

However, the effectiveness of cancellation varies inversely with component frequency, with the phase shift introduced by the differentiator increasing, and with the amplitude response of the differentiator decreasing, as the cutoff frequency of the high pass filter formed by the differentiator is approached. For the illustrative circuit values shown in the drawing, the cutoff frequency (at which the amplitude response of the filter is 3db. below maximum) for the high pass filter formed by differentiator 84, 86 falls at 780 KHz. With a phase shift of about 45° introduced by the differentiator at this frequency, only 30% cancellation is realized for low-amplitude excursions of a component at 780 KHz. For the illustrative circuit values, 50% cancellation is achieved at a component frequency of 1.35 MHz. (at which frequency, the differentiator introduces a phase shift of 30°).

It may further be noted that the buried subcarrier lies at a frequency (e.g., 1.53 MHz.) at which a significant percentage of cancellation of low-amplitude excursions can be effected by the noise reduction apparatus of the illustrated embodiment. Accordingly, such noise reduction apparatus may serve to lessen the amplitude of any residual buried subcarrier components undersirably retained in the output of adder 35. The noise reduction apparatus of the present invention thus augments the action of the player's luminance comb filter in protection against development of a coarse dot pattern of annoying visibility in pictures displayed in response to the output of the illustrated video disc player.

What is claimed is:

1. Noise reduction apparatus, for use with a source of signals, said signals being subject to occupancy of a given band of frequencies and undesirably subject to accompaniment by noise; said apparatus comprising:
    means, coupled to the output of said source of signals, for selectively passing signal components of said signal falling within a band of frequencies restricted to a high frequency portion of said given band;
    means, having an input terminal coupled to the output of said selective signal passing means, and having an output terminal, for amplifying and inverting the phase of signals applied to said input terminal;
    a signal path coupling said output terminal to said input terminal of said signal amplifying means;
    means, interposed in said signal path, for permitting negative feedback via said signal path only during amplitude excursions of the output signal of said amplifying means which exceed selected limits; and
    combining means, coupled to said source of signals and to the output terminal of said signal amplifying means, for subtracting the output of said signal amplifying means from the output of said source of signals.

2. Apparatus in accordance with claim 1, wherein said selective signal passing means comprises a differentiator including the series combination of a capacitor and a resistor; and
    wherein said resistor is included in said signal path.

3. Apparatus in accordance with claim 2, wherein:
    said negative feedback permitting means comprises two diodes connected in parallel and oppositely poled.

4. Apparatus in accordance with claim 3, also including a blocking capacitor; and
    wherein said signal path consists of said blocking capacitor, said paralleled diodes, and said resistor, connected in series between said output terminal and said input terminal.

5. Noise reduction apparatus, for use with a source of signals, said signals being subject to occupancy of a given band of frequencies and undesirably subject to accompaniment by noise; said apparatus comprising:
    a differentiator, coupled to the output of said source of signals; said differentiator normally having an effective time constant of a given magnitude for selectively passing only a high frequency portion of the output of said source of signals;
    means, coupled to said differentiator, for both (1) limiting the amplitude of said high frequency portion within selected limits, and (2) reducing the effective time constant of said differentiator below said given magnitude during signal excursions beyond either of the selected limits; and
    combining means, coupled to said source of signals and to the output of said limiting means, for subtracting the amplitude limited output of said limiting means from the output of said source of signals.

6. In a system for playback of a record of successive color images, said system including means for deriving during said record playback a color image representative composite video signal, undesirably subject to accompaniment by noise, said composite video signal including a luminance signal subject to occupancy of a given band of frequencies, and a modulated color subcarrier forming a chrominance signal having frequencies interleaved with the frequencies of a portion of said luminance signal; said system further including comb filter means for deriving from said composite video signal (a) a luminance signal, at one output, subject to occupancy of said given band of frequencies and which is substantially free of said chrominance signal, and (b) a chrominance signal, at another output, substantially free of said luminance signal; a noise reduction apparatus comprising:

means coupled to said one output of said comb filter means, for selectively passing signal components of said luminance signal falling within a band of frequencies restricted to a high frequency portion of said given band; said selective signal passing means including a R-C differentiator network;

means coupled to the output of said selective signal passing means, for amplifying the output signal thereof;

a negative feedback path coupling the output of said signal amplifying means and the junction of capacitive and resistive elements of said differentiator;

means, interposed in said negative feedback path for activating said negative feedback path only during excursions of the amplitude of the output signal of said amplifying means which exceed selected limits; and combining means, coupled to said one output of said comb filter means and to the output of said signal amplifying means, for subtractively combining the output of said signal amplifying means with said luminance signal derived by said comb filter means.

7. Apparatus in accordance with claim 6, wherein: said combining means is additionally responsive to said other output of said signal deriving means and further serves to effect formation of an output composite signal inclusive of luminance and chrominance signal components.

* * * * *

Disclaimer 4,110,784.—*John Gordon Amery*, Quincy, Ill., and *Thomas William Burrus*, Indianapolis, Ind. NOISE REDUCTION APPARATUS. Patent dated Aug. 29, 1978. Disclaimer filed July 10, 1980, by the assignee, *RCA Corporation.*

Hereby enters this disclaimer to claim 1 of said patent.

[*Official Gazette September 9, 1980.*]